(12) United States Patent
Yasuda et al.

(10) Patent No.: US 10,560,606 B2
(45) Date of Patent: Feb. 11, 2020

(54) IMAGE PROCESSING DEVICE, IMAGE PROCESSING METHOD, AND NON-TRANSITORY COMPUTER READABLE MEDIUM

(71) Applicant: FUJI XEROX CO., LTD., Tokyo (JP)

(72) Inventors: Shunichi Yasuda, Kanagawa (JP); Kengo Tokuchi, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 235 days.

(21) Appl. No.: 15/223,233

(22) Filed: Jul. 29, 2016

(65) Prior Publication Data

US 2017/0264790 A1    Sep. 14, 2017

(30) Foreign Application Priority Data

Mar. 10, 2016 (JP) ................. 2016-046411

(51) Int. Cl.
*H04N 1/60* (2006.01)

(52) U.S. Cl.
CPC ................. *H04N 1/6027* (2013.01)

(58) Field of Classification Search
CPC ................. G06T 5/003; H04N 1/6027
See application file for complete search history.

(56) References Cited

U.S. PATENT DOCUMENTS

| | | | | |
|---|---|---|---|---|
| 9,147,232 B1* | 9/2015 | Kuo | .......................... | G06T 5/30 |
| 9,865,039 B2* | 1/2018 | Naruse | .................... | G06T 5/003 |
| 10,032,257 B2* | 7/2018 | Eguchi | .................... | G06T 5/003 |
| 10,165,266 B2* | 12/2018 | Fujio | ........................ | G01J 3/462 |
| 2002/0164051 A1* | 11/2002 | Reed | ...................... | G06T 1/0028 382/100 |
| 2003/0210332 A1* | 11/2003 | Frame | .................... | H04N 5/332 348/216.1 |
| 2004/0017509 A1* | 1/2004 | Kondo | ................. | H04N 11/146 348/453 |

(Continued)

FOREIGN PATENT DOCUMENTS

| | | |
|---|---|---|
| CN | 1513256 A | 7/2004 |
| CN | 101540821 A | 9/2009 |

(Continued)

OTHER PUBLICATIONS

Lou, Yuhong, "Color Restoration Based on Similar Images", Thesis Submitted to Zhejiang Normal University in partial fulfillment of the requirement for the degree of Master of Engineering,(Computer Software & Theory), May 2014, 27 pages.

(Continued)

*Primary Examiner* — Mia M Thomas
(74) *Attorney, Agent, or Firm* — Sughrue Mion, PLLC

(57) ABSTRACT

An image processing device includes an image acquiring unit, a color aid information acquiring unit, and a restoring unit. The image acquiring unit acquires, as a processing target image, an image with modified color information or an image with color information degraded from an original image. The color aid information acquiring unit acquires color aid information to be referred to at the time of restoring the color information of the processing target image. The restoring unit restores the color information of the processing target image on the basis of the color aid information.

15 Claims, 3 Drawing Sheets

(56) References Cited

U.S. PATENT DOCUMENTS

| | | | | |
|---|---|---|---|---|
| 2004/0096103 A1* | 5/2004 | Gallagher | G06T 5/004 | 382/167 |
| 2006/0245667 A1* | 11/2006 | Lertrattanapanich | G06K 9/0051 | 382/275 |
| 2007/0144390 A1* | 6/2007 | Fejfar | B41F 33/0036 | 101/484 |
| 2009/0080688 A1* | 3/2009 | Au | G06T 1/0028 | 382/100 |
| 2009/0297056 A1* | 12/2009 | Lelescu | H04N 5/217 | 382/261 |
| 2010/0208991 A1* | 8/2010 | Kimata | G06T 5/50 | 382/167 |
| 2010/0226588 A1* | 9/2010 | So | H04N 1/403 | 382/238 |
| 2012/0314129 A1* | 12/2012 | Mertens | G11B 27/11 | 348/474 |
| 2013/0016118 A1* | 1/2013 | Mizushiro | H04N 9/3147 | 345/589 |
| 2013/0194290 A1* | 8/2013 | Hamano | G02B 7/346 | 345/581 |
| 2013/0265598 A1* | 10/2013 | Donaldson | H04N 1/6027 | 358/1.9 |
| 2014/0009368 A1* | 1/2014 | Hirota | G06T 5/003 | 345/8 |
| 2014/0140619 A1* | 5/2014 | Mukhopadhyay | G06T 5/40 | 382/167 |
| 2014/0267915 A1* | 9/2014 | Bailey | H04N 5/14 | 348/575 |
| 2014/0348441 A1* | 11/2014 | Tezaur | G06T 5/003 | 382/255 |
| 2015/0195424 A1* | 7/2015 | Mizushiro | H04N 9/3147 | 345/600 |
| 2015/0207962 A1* | 7/2015 | Sugimoto | H04N 19/117 | 382/261 |
| 2015/0379695 A1* | 12/2015 | Naruse | H04N 1/409 | 348/234 |
| 2016/0027157 A1* | 1/2016 | Naruse | H04N 9/045 | 382/167 |
| 2016/0316098 A1* | 10/2016 | Reed | G06T 1/0028 | |
| 2017/0186140 A1* | 6/2017 | Eguchi | G06T 5/003 | |
| 2017/0230634 A1* | 8/2017 | Takenouchi | H04N 13/204 | |
| 2017/0287117 A1* | 10/2017 | Ebihara | G06K 9/40 | |
| 2017/0351893 A1* | 12/2017 | Schneider | G06K 7/146 | |

FOREIGN PATENT DOCUMENTS

| | | |
|---|---|---|
| CN | 102006389 A | 4/2011 |
| CN | 103297642 A | 9/2013 |
| JP | 2004-266392 A | 9/2004 |
| JP | 2007-43423 A | 2/2007 |
| JP | 2008-259199 A | 10/2008 |
| JP | 2009-27224 A | 2/2009 |
| JP | 2011-66734 A | 3/2011 |
| JP | 2012-253636 A | 12/2012 |

OTHER PUBLICATIONS

Communication dated Sep. 12, 2018 from the State Intellectual Property Office of the P.R.C. in counterpart Application No. 201610740601.5.

Communication dated May 17, 2019, from the China National Intellectual Property Administration in counterpart Application No. 201610740601.5.

Communication dated Nov. 19, 2019 from Japanese Patent Office in counterpart JP Application No. 2016-046411.

* cited by examiner

PROCESSING TARGET IMAGE RESTORED IMAGE

IMAGE PROCESSING DEVICE, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-046411 filed Mar. 10, 2016.

BACKGROUND (i) Technical Field

The present invention relates to an image processing device, an image processing method, and a non-transitory computer readable medium.

(ii) Related Art

At present, users often produce color documents. However, color documents are often printed and copied as monochrome documents by using copying machines in offices for cost cutting.

SUMMARY

According to an aspect of the invention, there is provided an image processing device including an image acquiring unit, a color aid information acquiring unit, and a restoring unit. The image acquiring unit acquires, as a processing target image, an image with modified color information or an image with color information degraded from an original image. The color aid information acquiring unit acquires color aid information to be referred to at the time of restoring the color information of the processing target image. The restoring unit restores the color information of the processing target image on the basis of the color aid information.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

First Exemplary Embodiment

Figure 1:
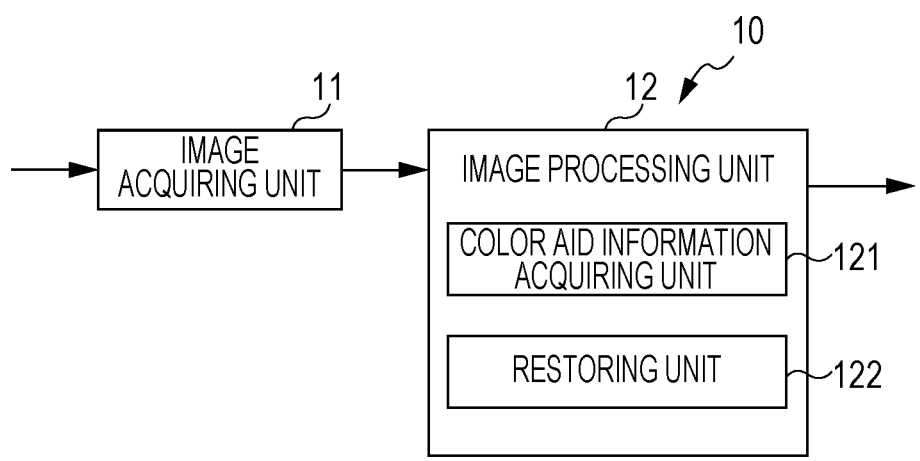
FIG. 1 is a block diagram illustrating a configuration of an image processing device according to a first exemplary embodiment of the present invention.
Figure 2:
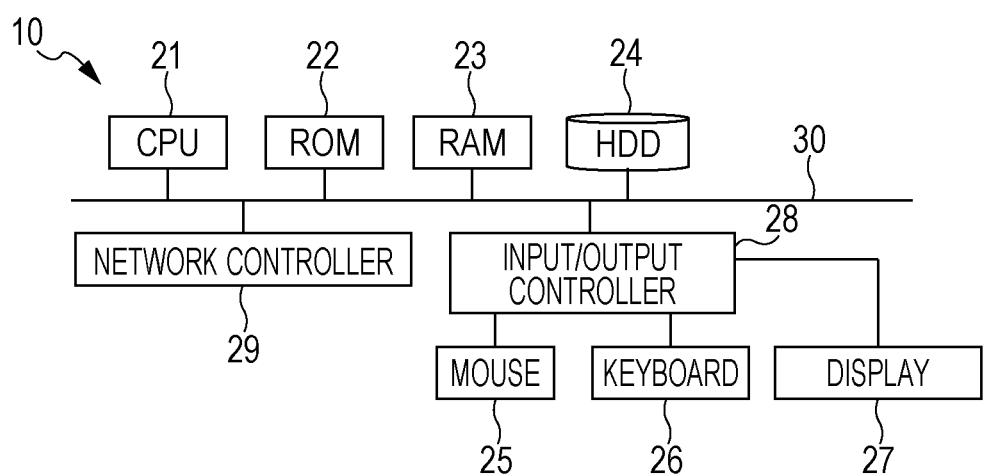
FIG. 2 illustrates a hardware configuration of a computer serving as an image processing device according to the exemplary embodiment.

FIG. 1 is a block diagram illustrating a configuration of an image processing device according to a first exemplary embodiment of the present invention. FIG. 2 illustrates a hardware configuration of a computer serving as an image processing device 10 according to this exemplary embodiment. The computer serving as the image processing device 10 according to this exemplary embodiment may be realized by an existing general-purpose hardware configuration, such as a personal computer (PC). That is, as illustrated in FIG. 2, the computer includes a central processing unit (CPU) 21, a read only memory (ROM) 22, a random access memory (RAM) 23, a hard disk drive (HDD) 24, an input/output controller 28 connected to a mouse 25 and a keyboard 26 provided as input units and to a display 27 provided as a display device, and a network controller 29 provided as a communication unit. The CPU 21, the ROM 22, the RAM 23, the HDD 24, the input/output controller 28, and the network controller 29 are connected to an internal bus 30.

Referring back to FIG. 1, the image processing device 10 according to the exemplary embodiment includes an image acquiring unit 11 and an image processing unit 12. Note that components that are not described in this exemplary embodiment are omitted from FIG. 1. The image acquiring unit 11 acquires, as a processing target image, an image with modified color information or an image with color information degraded from an original image.

The expression "image with modified color information" (hereinafter referred to as a "monochrome image") means an image generated by specifying a monochrome image as an output image at the time of scanning a color document. Alternatively, the image with modified color information may be generated by scanning a monochrome document. If a color document is read and "black and white" is selected as a color mode (printing color) for printing, a monochrome document is produced. The expression "image with color information degraded from an original image" may correspond to the form of data obtained by reading a color document whose color information is degraded by aging degradation, or image data generated with a part of color information being deficient as a result of performing certain image processing. The expression "processing target image" means such an image whose color information has been degraded compared with an original image.

The image processing unit 12 performs image processing, which will be described later, on the processing target image acquired by the image acquiring unit 11. A color aid information acquiring unit 121 included in the image processing unit 12 acquires color aid information to be referred to at the time of restoring the color information of the processing target image. A restoring unit 122 included in the image processing unit 12 restores the color information of the processing target image on the basis of the acquired color aid information.

The image acquiring unit 11 and the image processing unit 12 included in the image processing device 10 are implemented by cooperative operation of the computer serving as the image processing device 10 and programs executed by the CPU 21 installed on the computer.

The programs used in this exemplary embodiment may be provided by using a communication medium or may be provided by being stored in a computer readable recording medium such as a compact disc read only memory (CD-ROM) or a universal serial bus (USB) memory. The programs provided from the communication medium or the recording medium are installed on a computer, and the CPU 21 of the computer sequentially executes the programs, thereby realizing various processes.

Operations according to this exemplary embodiment will be described next. It is assumed that the processing target image discussed in the exemplary embodiment is in the form of monochrome electronic data with no color information.

However, it is assumed that the original image (document) of the processing target image is a color image (color document).

Upon user's selection of an image data file to be processed, the image acquiring unit 11 acquires the selected image data file as the processing target image. Upon acquisition of the processing target image, the color aid information acquiring unit 121 in the image processing unit 12 acquires, as color aid information, a similar image that is similar to the processing target image by using an image search tool. Although a process for searching for the similar image may be performed by using a known technique, before checking the processing target image against an image obtained by the search process, the color aid information acquiring unit 121 converts the image obtained by the search process to a monochrome image. Alternatively, the processing target image may be checked against the image obtained by the search process without referring to the color information of the image obtained by the search process. Note that the color aid information acquiring unit 121 searches a prepared database, an Internet accessible database, or the like for the similar image. On the assumption that an image generated by scanning an original image (color document) remains being stored in an image forming device, a built-in HDD in the image forming device may be searched. If plural similar images are found, the search result may be presented to the user, and the user may be allowed to select any one of the images as the similar image to be used by the restoring unit 122.

For the aim of this exemplary embodiment, an attribute of the selected similar image other than the color information, such as the layout, is supposed to be similar to that of the processing target image. If the layout is similar, the restoring unit 122 colors a predetermined area in the processing target image by referring to the color information of a corresponding area in the similar image.

Figure 3:
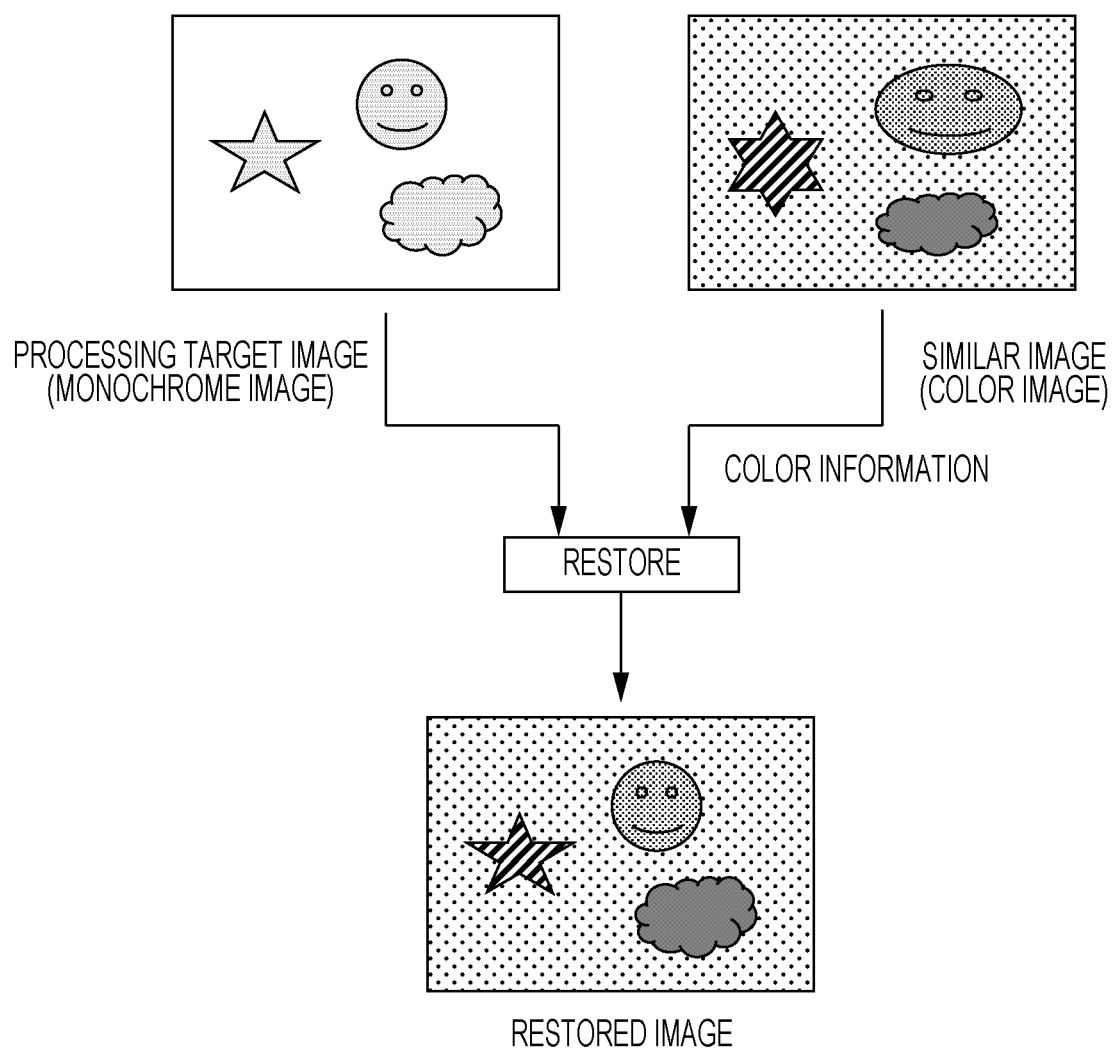
FIG. 3 is a conceptual diagram illustrating a method for restoring the color information of a processing target image according to the exemplary embodiment.

It is assumed that the processing target image is an image including a star on the left, a face on the upper right, and a cloud on the lower right as illustrated in FIG. 3. Since the color aid information acquiring unit 121 selects a similar image whose layout is the same as or similar to the layout of the processing target image, by referring to the color information of the star, the face, and the cloud in the similar image at positions corresponding to the star, the face, and the cloud in the processing target image, the restoring unit 122 colors the star, the face, and the cloud in the processing target image. In the above manner, the restoring unit 122 colors the processing target image by referring to the similar image.

At the time of coloring, the restoring unit 122 may refer to the date and time the similar image acquired by the color aid information acquiring unit 121 was created. If the time is in the nighttime, the tone may be adjusted to be darker; if the time is in the daytime, the tone may be adjusted to be brighter. In addition, if the similar image is of the outside, the tone may be adjusted by referring to information regarding the weather on the date and time the image acquired by the color aid information acquiring unit 121 was taken.

If attribute information added to candidate similar images includes time information including the date and time an image was created, for example, the time information may be referred to in addition to the date and time the similar image was created. In the case of photographs, a photographic image may include at a part thereof (typically at the lower right corner) a stamp indicating the date and time the image was taken. Accordingly, in the case where the similar image is a photographic image, the time information on the photographic image may be referred to.

If the attribute information is added to the candidate similar images, the color aid information acquiring unit 121 may select a similar image by referring to the attribute information. The attribute information indicates, for example, a characteristic point of the image as follows: there are three persons in the image, a person is wearing a hat, a black dog is running, the outside is covered with snow, or the like. Note that the user is able to specify which piece of the attribute information is to be picked up (as a comparison target) from the processing target image to be reflected on the color aid information in an enhanced manner.

The above description has illustrated the case where the color information of the processing target image is restored to be the same as the color information of the original image on the basis of the similar image with the aim of reproducing the original image. As a matter of course, it is not guaranteed that the color information of the processing target image is identical to the color information of the original image because the color information of the original image is not referred to. However, if the original image of the processing target image is successfully selected as the similar image, it is possible to reproduce the original image.

In the case where the color information is extracted from the original image and where it is possible to embed the color information in a monochrome image, the restoring unit 122 may perform a restoration process on the processing target image by using the color information extracted from the monochrome image. The embedded information may be visible or invisible.

In the case where storing location information including information regarding the storing location of the original image is recorded on a code, such as a quick response (QR) code (registered trademark), and where the original image is formed by embedding the QR code in the original image, the QR code is also embedded in a monochrome image generated from the original image. In this case, the color aid information acquiring unit 121 acquires, as the color aid information, the storing location information extracted by reading the QR code embedded in the processing target image. The restoring unit 122 acquires the original image by accessing the storing location according to the storing location information. In the above manner, the restoring unit 122 performs a replacing process in which the original image is acquired and in which the processing target image is replaced with the original image, instead of performing image processing directly on the processing target image. The use of the code, as described above, on which the storing location information has been recorded enables the original image to be completely restored from the processing target image.

The color information of the original image instead of the storing location information thereof may be recorded on the QR code, or the storing location information of the original image may be embedded in a monochrome image.

Note that this exemplary embodiment has described the case where the processing target image is specified by the user on the assumption that the image processing device 10 is realized as a PC. However, the image processing device 10 may be realized as an image forming device. The image forming device is a multifunction peripheral that includes an image processing device (computer), a scanner, a printer engine, and the like and that provides various functions, such as a copying function and a scanning function. The image forming device according to this exemplary embodiment acquires, as the processing target image, a monochrome image obtained by scanning a monochrome document and performs the above-described process for restoring the color information, thereby outputting a color image. That is, when a user copies a monochrome document by using the image forming device according to this exemplary embodiment, the document is output by being colored as if the document is the original image (color document).

Second Exemplary Embodiment

The first exemplary embodiment aims to restore the colors of the entire processing target image to be those of the original image, whereas this exemplary embodiment aims to restore at least a part of the processing target image to be that of the original image if it is not possible to acquire the color information of the entire image.

Figure 4:
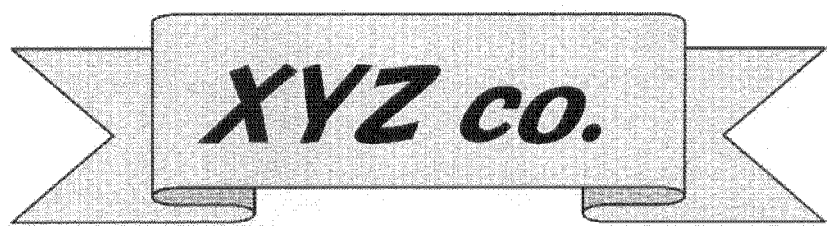
FIG. 4 illustrates an example of a company logo to which a second exemplary embodiment applies.

FIG. 4 illustrates an example of a company logo. The colors of the logotype and the logo mark of the company logo are determined. For example, the character "XYZ co." is determined to be green, and that the ribbon part of the figure is determined to be yellow.

The color aid information acquiring unit 121 acquires, as color aid information, a certain company logo (logo image) from a prepared database or through the Internet. The restoring unit 122 converts the image of the company logo into a monochrome image and checks the converted image of the company logo against the processing target image in order to determine whether or not the processing target image includes an image having the same shape as that of the converted image of the company logo. As a manner of course, the size of the company logo may be increased or decreased as necessary. If the restoring unit 122 determines that the processing target image includes the company logo, the restoring unit 122 colors the image included in the processing target image in accordance with the color information of the company logo.

Although this exemplary embodiment has described the image of the company logo as an example of the logo image, any of various logo images including logotypes and logo marks on products and the like may also be acquired as the color aid information.

Third Exemplary Embodiment

Although the second exemplary embodiment has particularly described the logo image, the color aid information acquired by the color aid information acquiring unit 121 is not necessarily limited to the logo image. The color aid information acquiring unit 121 acquires, as color aid information, information regarding images of various objects (e.g., bananas) (object images) associated with basic colors thereof (e.g., yellow).

The restoring unit 122 searches for an object image included in a processing target image and determines what type of object the object image represents. Upon detection of an image of a banana, by referring to the color aid information, the restoring unit 122 colors the image of the banana in the basic color of a banana, that is, yellow. Although the above description has illustrated the example of a single object, which is a banana, having a single color, the above method is applicable to objects whose colors and color arrangements are predetermined, such as a traffic light, the Olympic rings, and a pedestrian crossing.

As described above, according to this exemplary embodiment, at least a part of the processing target image is restored to be that of the original image on the basis of the basic color of each object. Depending on the object, the basic color thereof may not be uniquely specified. If the object is a person, the hair color and the skin color differ for each person. However, a person having some colors in the image may be more easily found than in a monochrome image, which is not colored.

Fourth Exemplary Embodiment

In this exemplary embodiment, if it is not possible to acquire the color information of an image, the processing target image is colored on the basis of an input by a user.

Figure 5:
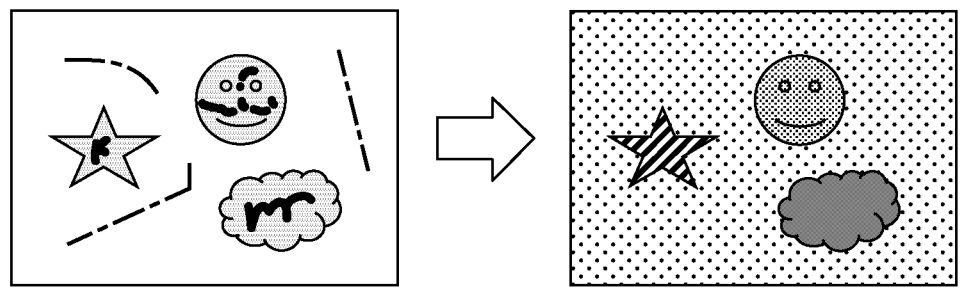
FIG. 5 is a conceptual diagram illustrating another method for restoring the color information of a processing target image according to a fourth exemplary embodiment.

FIG. 5 illustrates a processing target image on the left and a restored image, which has been colored, on the right. The color aid information acquiring unit 121 displays the processing target image on a screen. The user specifies areas and colors for coloring the image by recalling the colors used in the original image of the processing target image. For example, the user issues instructions indicating that the star on the left is colored in gold, that the face on the upper right is colored in pale orange, that the cloud on the lower right is colored in light blue, and that the background is colored in yellow. The user specifies the areas and colors for coloring by, for example, drawing a line with a gold pen within the area of the star, and similarly drawing lines with a pale-orange pen, a light-blue pen, and a yellow pen respectively within the area of the face, within the area of the cloud, and on the background. Note that FIG. 5 indicates the color differences by using a solid line, a broken line, and a dot-and-dash line. The color aid information acquiring unit 121 acquires such instructions input by the user as color aid information.

By referring to the color aid information, the restoring unit 122 specifies the areas on the processing target image in which the user has drawn lines with pens. The restoring unit 122 specifies the range of each area by finding a line on which the pixel value changes markedly as a boundary between the areas. Then, the restoring unit 122 colors each area in the color specified with the corresponding pen. Since the coloring range is specified in the above manner, the user does not have to input information indicating the area. It is sufficient for the user to specify the color with a pen at an arbitrary position within the area. Note that a known technique may be used for the process related to putting colors in this exemplary embodiment.

As described above, according to this exemplary embodiment, the color information of the original image is restored on the basis of the user's recollection. Note that the user is able to color the processing target image in desired colors by specifying those colors, instead of specifying the colors used in the original image. Accordingly, it is possible to provide this exemplary embodiment as a service for monochrome-image coloring, instead of a service for restoring an original image.

Fifth Exemplary Embodiment

At present, many documents including business documents are often created by using a word processor program, for example. The content of such documents may be revised by handwriting. The handwritten characters are sometimes made to be different from printed characters in order to be noticeable. For example, the revision is performed with a red pen in the case where the printed characters are black. This exemplary embodiment is suitable for such a case where the document including handwritten characters is an original document (color document) and where there is no color information of the original image.

Upon acquisition of a processing target image of the original image, the color aid information acquiring unit 121 acquires, as color aid information, for example, information indicating that the handwritten characters are to be colored as instructed by a user and in what color the handwritten characters are to be colored. Upon recognition from the color aid information that the handwritten characters are to be colored, the restoring unit 122 analyzes the processing target image so as to specify the handwritten characters. For example, a character corresponding to no font or an image corresponding to a predetermined condition, such as an image other than arrayed characters, is determined to be a handwritten character. Then, the restoring unit 122 colors an image determined to be a handwritten character in a specified color, such as red.

This exemplary embodiment has illustrated above the case where the image corresponding to a predetermined condition is the image of the handwritten character as an example and where the handwritten character is colored in red as an example of a color to be restored. Note that an image other than the handwritten character may be an image to be colored. For example, it is assumed that a test is scored by marking a circle for a correct answer and an X for an incorrect answer on an answer sheet. Since the answers are typically written with a black pen, the symbols such as circles and Xs indicating whether the answers are correct or incorrect are often written in red regardless of whether the scoring is made manually or mechanically. Accordingly, when the color aid information acquiring unit 121 acquires, as color aid information, the symbols (circles and Xs) to be colored and the colors for coloring the symbols, the restoring unit 122 detects circles and Xs in the processing target image and colors the circles and Xs in red.

In addition, in the case of drawing plural lines in a single graph, the colors of the lines are typically made to be different from each other so as to make it possible to distinguish the lines from each other. In this case, the restoring unit 122 analyzes the processing target image, thereby specifying the lines in the graph, and colors the lines in different colors. Although the colors may be different from those used in the original image, the lines in the graph become plain, thereby becoming easy to visually recognize.

In some cases, a part of the content is underlined in order to be noticeable. In such a case, a line below a single character or a line below and along plural characters included in the processing target image is determined to be an underline, and the underline may be colored in red. In addition, an array of characters having a specific purpose, such as a character string starting with "http", is regarded as information indicating an information storing location and colored in blue.

In the above manner, the color aid information acquiring unit 121 may acquire, as color aid information, conditions for specifying the target to be colored. Examples of the conditions include the position of a specified object, such as an underline; the shape thereof, such as a circle; an attribute value thereof, such as a size; and regularly arrayed characters. Furthermore, on the basis of the color aid information, the restoring unit 122 may specify the object to be colored and may color the object in a specified color. At least a part of a processing target image is thus restored.

According to this exemplary embodiment, it is possible to color a specified object in a desired color that is specified by the user. Accordingly, as in the fourth exemplary embodiment, it is possible to provide this exemplary embodiment as a service for monochrome-image coloring instead of a service for restoring the original image.

The above exemplary embodiments aim to restore the color information of the entire or a part of the processing target image. However, the above exemplary embodiments may also be used as a monochrome-image coloring service as long as the image processing device 10 has a configuration applicable to coloring different from that of the original image, as in the fourth and fifth exemplary embodiments.

Various exemplary embodiments used to restore the color information of a processing target image have been described above. These techniques may also be used in an appropriate combination.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    at least one hardware processor configured to implement:
        an image acquiring unit that acquires, as a processing target image, an image with modified color information or an image with color information degraded from an original image;
        a color aid information acquiring unit that acquires color aid information to be referred to at a time of restoring the color information of the processing target image; and
        a restoring unit that restores the color information of the processing target image using the color aid information,
    wherein either the image, with the modified color information, or the image, with color information degraded from the original image, is more similar to the original image after the color information is restored than before the color information is restored.

2. The image processing device according to claim 1, wherein the color aid information acquiring unit acquires, as the color aid information, a similar image that is similar to the processing target image.

3. The image processing device according to claim 2, wherein the similar image has attribute information including time information, and the restoring unit adjusts, at a time of coloring the processing target image, a tone of the processing target image using the time information.

4. The image processing device according to claim 2, wherein, if attribute information is added to images each being a candidate similar image, from among the candidate similar images, the color aid information acquiring unit selects and acquires the similar image as the color aid information using attribute information.

5. The image processing device according to claim 1, wherein the processing target image includes embedded information, and the restoring unit acquires color information of the original image of the processing target image using the embedded information.

6. The image processing device according to claim 1, wherein the processing target image includes storing location information added thereto, and the restoring unit acquires the original image of the processing target image using the location information.

7. The image processing device according to claim 1, wherein the color aid information acquiring unit acquires a logo image as the color aid information, the processing target image includes an image having the same shape as the logo image, and the restoring unit applies color information of the logo image to information of the image.

8. The image processing device according to claim 1, wherein the processing target image includes an object image, and the restoring unit applies information of a basic color, of an object represented by the object image, to information of the object image.

9. The image processing device according to claim 1, wherein the color aid information is a second image acquired by the color aid information acquiring unit by searching a database.

10. The image processing device according to claim 1, wherein the color aid information acquiring unit further searches a database by either the image, with the modified color information, or the image, with color information degraded from the original image.

11. The image processing device according to claim 1, wherein the color aid information acquiring unit further searches a database by a code extracted from either the image, with the modified color information, or the image, with color information degraded from the original image.

12. The image processing device according to claim 1, wherein the processing target image includes a specified range, and the restoring unit applies predetermined color information to information of the specified range.

13. The image processing device according to claim 1, wherein the processing target image includes an image corresponding to a specific condition, and the restoring unit applies predetermined color information to information of the image.

14. An image processing method comprising:
acquiring, as a processing target image, an image with modified color information or an image with color information degraded from an original image;
acquiring color aid information to be referred to at a time of restoring the color information of the processing target image; and
restoring the color information of the processing target image using the color aid information,
wherein either the image, with the modified color information, or the image, with color information degraded from the original image, is more similar to the original image after the color information is restored than before the color information is restored.

15. A non-transitory computer readable medium storing a program causing a computer to execute a process for image processing, the process comprising:
acquiring, as a processing target image, an image with modified color information or an image with color information degraded from an original image;
acquiring color aid information to be referred to at a time of restoring the color information of the processing target image; and
restoring the color information of the processing target image using the color aid information,
wherein either the image, with the modified color information, or the image, with color information degraded from the original image, is more similar to the original image after the color information is restored than before the color information is restored.

* * * * *